Dec. 21, 1954   J. M. RIBBLE ET AL   2,697,652
NITRIC ACID PLANT AND CONTROL SYSTEM
Filed May 22, 1950
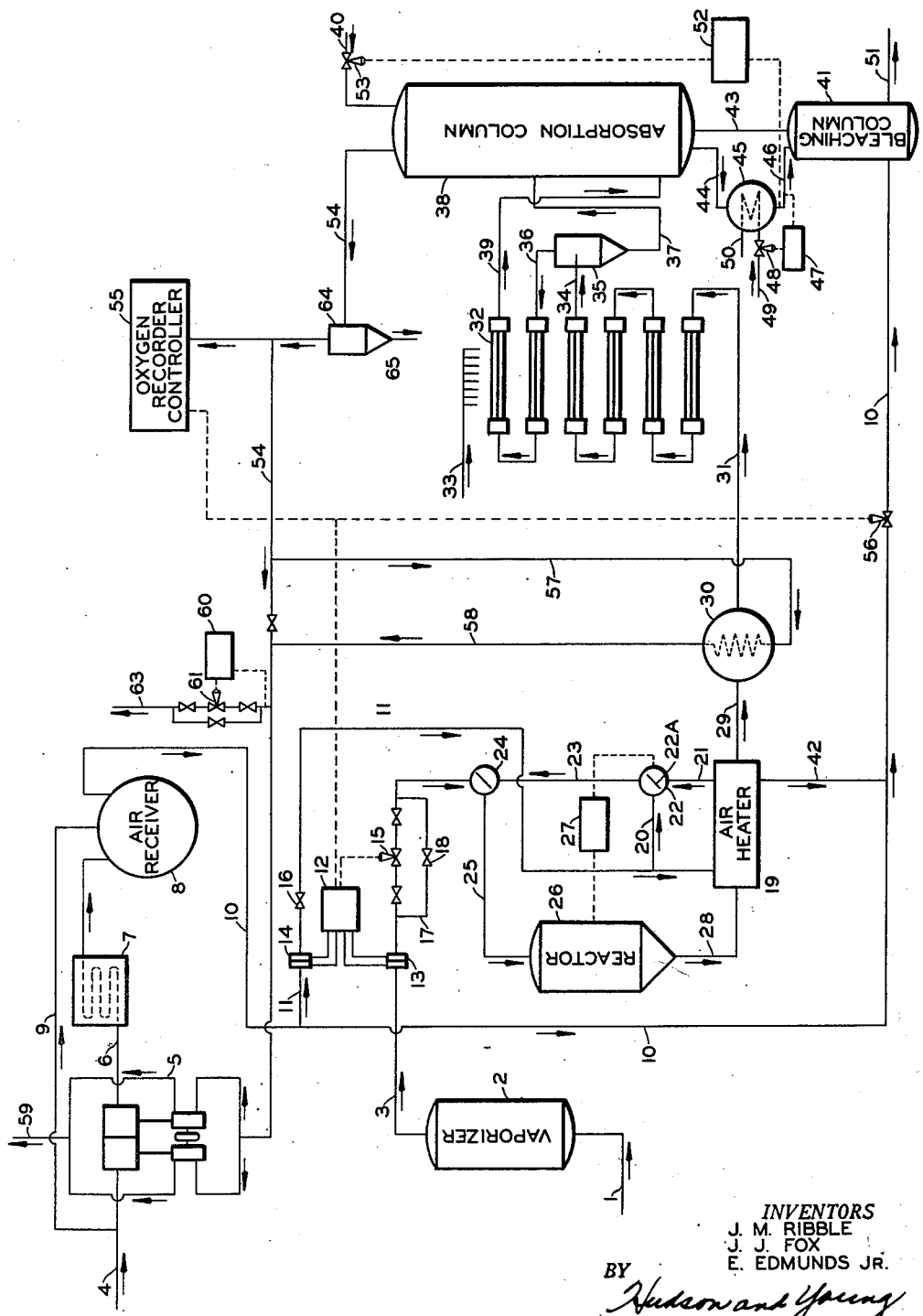
INVENTORS
J. M. RIBBLE
J. J. FOX
E. EDMUNDS JR.
BY Hudson and Young
ATTORNEYS

United States Patent Office 2,697,652
Patented Dec. 21, 1954

2,697,652

NITRIC ACID PLANT AND CONTROL SYSTEM

Jack M. Ribble and Jack J. Fox, Bartlesville, Okla., and Edward Edmunds, Jr., Albuquerque, N. Mex., assignors to Phillips Petroleum Company, a corporation of Delaware Application May 22, 1950, Serial No. 163,444

7 Claims. (Cl. 23—260)

This invention relates to the manufacture of nitric acid. In a specific aspect this invention relates to a method and apparatus for the production of nitric acid from ammonia.

It is well known that, in the production of nitric acid from ammonia, the ammonia gas is first catalytically oxidized to oxides of nitrogen, principally nitric oxide, and the oxides of nitrogen produced together with an excess of air, with which the nitric oxide reacts to form nitrogen dioxide, are subsequently absorbed in water to produce nitric acid. In the usual process for the production of nitric acid from ammonia, the gases, rich in nitric oxide, from the oxidation chambers in which the ammonia is oxidized, are passed under atmospheric or higher pressure together with an excess of air into an oxidation chamber, where the nitric oxide is oxidized to nitrogen dioxide. The nitrogen dioxide-containing gas mixture is then passed through an absorption column in counterflow with a current of water, and the resulting nitric acid is recovered from the process.

It is recognized that to obtain maximum efficiency from the process it is essential that the ratio of ammonia to air in the ammonia oxidation reaction and the amount of air consumed in the entire process be rigidly controlled. Unintentional changes in flow rates, caused by such simple factors as a drop in the voltage or frequency of the electrical power supply, may effect a variation in the ratio of ammonia to air with its consequent effect upon the efficiency of the process. Also, intentional changes in flow rates to control the rate of manufacture are sometimes necessary. Heretofore, when such a change in rate of manufacture was to be made, it was necessary to regulate the amount of ammonia, to change the amount of air to that necessary under the new conditions, and to guard against overheating of the catalyst, and to manually and experimentally harmonize all these factors was difficult and time-consuming.

An object of this invention is to generally improve the method and apparatus for the manufacture of nitric acid by ammonia oxidation.

A further object of this invention is to overcome the foregoing difficulties and to provide automatic regulation of the process.

A further object of this invention is to provide a method for automatically controlling the amount of oxygen consumed in such a process.

A further object of this invention is to provide a method for automatically controlling the amount of air introduced to the ammonia oxidation reactor.

A further object of this invention is to provide a method for automatically controlling the amount of air introduced to the nitric oxide oxidation zone to form nitrogen dioxide.

Further and additional objects of our invention will be readily apparent from the disclosure and description of the drawing hereinbelow.

To accomplish these objects and other objects that will hereinafter appear we employ our invention consisting of the method and the apparatus elements and their relationship to each other. Our invention will be described in detail with reference to the accompanying drawing which is a flow diagram of a preferred manner of carrying out our invention. Such conventional equipment as pumps, filters, and the like, other than those required for an understanding of our invention, have not been included in this drawing, but the inclusion of such equipment is within the scope of our invention.

Referring now to the accompanying drawing, ammonia enters the system via line 1 and passes to vaporizer 2, provided with steam coils or other suitable means for heating and vaporizing the ammonia. Ammonia gas leaves vaporizer 2 via line 3 for mixing with air prior to entrance into the oxidation reaction. Air enters the system via line 4, and at least a portion thereof passes into power recovery compressor 5 wherein the expansion of the residual gases or off-gases from the system is employed to compress the air supplied to the system. Compressed air from compressor 5 passes via line 6 to cooler 7 and thence to air receiver 8. Any air, entering the system, that is not passed through compressor 5, is passed to receiver 8 directly via line 9. Air from receiver 8 is withdrawn and passed via line 10, and a portion thereof is passed via line 11 to the ammonia oxidation reaction. In actual operation the air in line 10 is at a pressure of about 105 pounds per square inch gauge and a temperature of 49° C., and the ammonia in line 3 is at a pressure of about 160 pounds per square inch gauge and a temperature of 71° C.

The ammonia and air from the oxidation reaction passing via lines 3 and 11 respectively are mixed prior to entrance into the oxidation reaction as described hereinbelow. To effect the oxidation reaction the ratio of ammonia to air in the reaction mixture is closely controlled in order to obtain maximum conversion efficiency and to minimize the danger of the formation of explosive mixtures. Air-ammonia mixtures containing less than 8 or more than 10.5 volume per cent ammonia show too low a conversion efficiency, and the preferred concentration of ammonia in the air-ammonia mixture is within the range of 9.5 to 10.3 volume per cent. In order to control the air-ammonia mixture within these limits a ratio control device is employed to proportion the volume of the ammonia gas passing via line 3 to the volume of process air passing via line 11. Any suitable means for controlling the volumetric ratio of air to ammonia may be used. For example, in some instances a single differential ratio flow controller is satisfactory. We prefer to employ a recorder receiver flow controller, shown on the drawing as controller 12, to accomplish the desired control. Controller 12 is set to maintain a concentration of ammonia of 9.5 to 10.3 volume per cent in the air-ammonia mixture, and this setting is automatically adjusted within this range in accordance with the oxygen content of the off-gas from the system in a manner to be described hereinbelow. Lines 3 and 11 are provided with flow transmitters 13 and 14 respectively, and these transmitters are connected directly to controller 12. Accordingly, the flow rates in lines 3 and 11 are transmitted to controller 12 which operates motor valve 15 in ammonia line 3 either electrically, mechanically or pneumatically. For each change in the flow rate in air line 11, as transmitted to controller 12 by transmitter 14, controller 12 automatically adjusts the ammonia flow rate in line 3 to maintain a constant air-ammonia mix. Thus the desired air to ammonia ratio is maintained constant at all flow volumes within the range of the measuring instruments. It is desirable to employ a flow controller that operates over a wide range in order that ratio control is obtained with the low flow rates at start-up as well as the high flow rates at maximum production. Line 11 is provided with valve 16 which is employed to manually control the air flow rate in that line. Ammonia line 3 is provided with by-pass line 17 and valve 18 which is ordinarily employed when the ammonia flow is on manual operation. Such operation is employed when the process is being started or when the required ammonia volume exceeds the capacity of motor valve 15.

Prior to being mixed with ammonia, the air for the oxidation reaction is conducted via line 11 to air heater 19 for preheating of the air. In heater 19 the air is passed into heat exchange relationship with the effluent from the oxidation reaction. A portion of the air in line 11 passes to mixer 22 via line 20 without passing through heater 19, and consequently, this portion of air is not preheated. The remaining air for the oxidation reaction enters heater 19, and its temperature is elevated therein. The heated air is withdrawn from heater 19 via line 21, and this air, as well as the air in line 20, is passed to mixer 22 containing damper 22A. The adjustment of damper 22A is controlled by the catalyst temperature in the oxidation reactor in order to obtain the desired preheat temperature of the air for the oxidation reaction. After mixing of the hot and cooler air in mixer 22, the air passes via line 23 to mixer 24 where it is admixed with the ammonia to be oxidized. In view of the operation of controller 12, previously described, air and ammonia are admixed in mixer 24 in the proper volumetric proportions for the oxidation reaction. Admixed air and ammonia pass via line 25 to oxidation reactor 26.

Reactor 26 is provided with a suitable catalyst for effecting the oxidation reaction. The preferred type of catalyst is a platinum catalyst. Platinum alone or platinum in an alloy with a noble metal, such as copper, nickel, cobalt, silver, tungsten, vanadium, and the like, may be employed. The preferred type of catalyst is a platinum-rhodium alloy containing about 10 per cent rhodium. This latter catalyst is usually used in the form of an 80-mesh gauze with the gauze in either single or multiple layers. Actually, various physhical forms of the catalyst may be used instead of the wire gauze form. For example, the catalyst may be in the form of perforated sheets, narrow strips of metallic turnings, impregnated masses, and the like. The wire gauze type is preferred, and it may be in any suitable form, such as cylindrical baskets, flat sheets, and the like.

In reactor 26 ammonia is oxidized with air in accordance with the following equation $$4NH_3 + 5O_2 \rightarrow 4NO + 6H_2O$$

The reaction is exothermic and it may start at a temperature as low as 500° C. Temperature increases favor the formation of nitric oxide, but at temperature above 970° C. the formation of nitrogen as a product of the reaction is increased. The nitrogen forms as a result of the oxidation of ammonia to water and nitrogen instead of nitric oxide. Reaction temperatures within the range of 900 to 970° C. are employed, and the minimum allowable conversion of ammonia is 96 per cent. Conversion rates increase with reaction temperature up to 950 to 960° C. at which temperature conversion rate increases become negligible. It is preferred not to operate at temperatures above 930° C., except for short periods of time, due to the catalyst losses at higher temperatures. The most preferred temperature is within the range of 900 to 910° C. Since high pressures tend to increaese the formation of nitrogen at the expense of the desired nitric oxides, pressures in excess of 125 pounds per square inch are usually not employed.

The temperature in reactor 26 is maintained within the desired temperature by controlling the preheat temperature of the air prior to its admixture with ammonia. A temperature responsive device, such as a Chromel-Alumel thermo-couple, is placed in the wire gauze catalyst or slightly below it. The device is connected to recording temperature controller 27 which by electrical, mechanical or other suitable means adjusts damper 22A in mixer 22. Whenever the gauze temperature in reactor 26 fluctuates from a predetermined temperature within the range already discussed, controller 27 adjusts damper 22A in a manner that the preheat temperature of the air flowing in line 23 is increased or decreased, as the case may be. If the temperature in reactor 26 becomes too high, damper 22A is adjusted to admit more cool air via line 20 and less hot air via line 21. On the other hand, if the temperature in reactor 26 becomes too low, damper 22A is adjusted to admit more hot air via line 21 and less cool air via line 20, and thus the preheat temperature of the air-ammonia mixture is increased with a resulting increase in the reactor temperature. The temperature of the preheated air is usually adjusted to maintain the preheat temperature of the air ammonia mixture within the range of 280 to 310° C., although high and lower preheat temperatures may be used.

The gaseous effluent leaving the gauze catalyst in reactor 26 contains by volume about 10 per cent nitric oxide and about 7 per cent oxygen in addition to steam and nitrogen, and the gas is at a temperature of about 900° C. The lower portion of reactor 26 is surrounded by a cooling jacket, that cools the gaseous reaction effluent to about 750° C. The reaction effluent is withdrawn from reactor 26 via line 28 and thence via heater 19 where it serves to preheat the air for the oxidation reaction. In air heater 19 the reaction effluent is cooled to about 500° C. From heater 19 the gaseous effluent is withdrawn via line 29, and then it is further cooled to about 300° C. by passage through heat exchanger 30 in heat exchange relationship with a part or all of the off-gas from the system. Effluent gases are withdrawn from heat exchanger 30 via line 31 to condenser 32 where the effluent is further cooled to a temperature no higher than 150° C. Condenser 32 is a series of cooling tubes over which water is flowed to absorb heat and effect the necessary cooling. Upon being cooled to a temperature no higher than 150° C., the nitric oxide in the reaction effluent is oxidized by the oxygen also present in that effluent in accordance with the following equation:

$$2NO + O_2 \rightarrow 2NO_2$$

This reaction is exothermic, and it is necessary for the cooling water flowing over the condensing tubes to remove this heat as well as to cool the reaction effluent. Water to effect the heat removal in condenser 32 enters the system via line 33 and thence it flows downwardly over the condenser tubes. About 90 per cent of the nitric oxide entering condenser 32 is oxidized to nitrogen dioxide which reacts with water in the oxidation effluent to form nitric acid in accordance with the following equation:

$$3NO_2 + H_2O \rightarrow 2HNO_3 + NO$$

This reaction is also exothermic and it forms additional quantities of nitric oxide to be oxidized with oxygen to nitrogen dioxide.

At an intermediate point in condenser 32 the oxidation effluent passing therethrough is passed via line 34 to acid separator 35 where weak nitric acid is separated and gaseous oxidation effluent is returned to condenser 32 via line 36. Weak nitric acid is withdrawn from separator 35 via line 37, and it is introduced to absorption column 38 on that plate or tray which contains nitric acid of the same strength as that in line 37. Introduction of the weak acid at a lower point in column 38 causes a dilution of the nitric acid product, and introduction of the weak acid at a higher point in the column places an excessive burden on the top of the column and it leads to high yield losses in the stack or off-gases.

Effluent from condenser 32 is withdrawn via line 39 and then passed to absorption column 38. In actual operation the feed to column 38 is at a temperature of about 30° C. Column 38 is a bubbler cap absorption column containing a series of plates or trays, and water or steam condensate is introduced to the top of the column via line 40. The water passes down through the column where it reacts with nitrogen dioxide to form nitric acid and where it absorbs the nitric acid thus formed. The reaction of nitrogen dioxide and water forms nitric oxide, and this nitric oxide as well as the nitric oxide entering the column via line 39 is oxidized to nitrogen dioxide for further reaction with water. Column 38 is operated at the lowest temperature obtainable with ordinary cooling water, usually within the range of 20 to 40° C., and the pressure in column 38 is about 80 pounds per square inch.

The nitric acid withdrawn from column 38 contains some nitric oxide, and consequently the acid has a slight brownish color. In order to remove this color the acid is passed to bleaching column 41 to which air is introduced for oxidation of the nitric oxide to nitrogen dioxide. Column 41 is a ring packed column connected with column 38. Nitric acid trickles over the packing against the upward flowing air stream which passes up into column 38 for oxidation of nitric oxide therein. Thus, air entering column 41 is employed to oxidize nitric oxide in column 41 and in column 38.

The bleaching action in column 41 is effected at a temperature above that at which column 38 is operated and usually within the range of 40 to 50° C. To obtain this temperature the air flowing in line 10 and entering column 41 is heated by withdrawing via line 42 a portion of the air entering and preheated in air heater 19. Sufficient air is withdrawn in line 42 to raise the temperature of the air flowing in line 10 to that necessary to produce the desired temperature in column 41. This method of operating has a disadvantage in that it changes the ratio of ammonia to air in the feed to reactor 26 after the feed mixture has been automatically adjusted to a predetermined ratio by controller 12. Controller 12 can be set to compensate for the withdrawal of air via line 42, but each time a change occurs in the rate of withdrawal via line 42 it is necessary to adjust controller 12 accordingly. When the air entering column 41 is preheated, as described, nitric acid passes from column 38 to column 41 via line 43. However, we prefer to operate our process by introducing cold air to column 41 and without removing air from heater 19 via line 42. In our preferred method of operation, nitric acid is withdrawn from column 38 via line 44, and it is then passed to steam heater 45 where it is heated to a temperature of 40 to 50° C. prior to passage into column 41 via line 46. A temperature responsive device in line 46 is connected to temperature controller 47 which operates motor valve 48 in steam line 49. In this manner the quantity of steam entering heater 45 is automatically controlled in such a manner that the temperature of the heated nitric acid is within the desired limits. Steam condensate is removed from heater 45 via line 50. It is desirable to maintain the temperature of the nitric acid passing to column 41 below 50° C. in order that the corrosive effect of the acid is kept at a minimum. Bleached nitric acid is withdrawn from column 41 via line 51 as a product of the process.

In order that the nitric acid produced in our process can have the desired concentration, the quantity of water or steam condensate entering the system via line 40 is automatically controlled. To effect this control, recording density controller 52 is connected to line 46 and valve 52 in line 40. Whenever a change occurs in the density of the nitric acid in line 46, indicating a change in concentration, controller 52 adjusts the setting of valve 53 to increase or decrease, as the case may be, the quantity of water entering column 38 via line 40 in order that the concentration of the nitric acid may be decreased or increased, as desired. In this manner any acid concentration can be obtained. Usually the concentration is at least 50 per cent, preferably at least 60 per cent, and more preferably 62 to 66 per cent.

Gaseous effluent from column 38, containing nitrogen, oxygen and nitrogen oxides, is withdrawn via line 54. For efficient operation of our process it is essential that the oxygen content of the effluent from column 38 be maintained within close limits, preferably not above 5 volume per cent, and more preferably within the range of 2 to 3 volume per cent. When the oxygen concentration drops below 2 volume per cent, excessive amounts of nitrogen oxides are lost in the gaseous effluent from column 38, and, when the oxygen concentration rises above 5 volume per cent, the power costs for operation of the system become excessive. Thus, the oxygen content of the gaseous effluent must be rigidly controlled.

We have found that the oxygen content of the effluent gas from column 38 can be employed to control automatically the oxygen consumption in the system. As a consequence of the control of the oxygen consumption in the system, the oxygen content of the effluent gas is maintained within the desired limits for efficient and economical operation. Control of the oxygen consumption in the system can be effected by two methods, i. e., the ratio of ammonia to air in the reaction mixture entering reactor 26 can be automatically controlled or the quantity of air entering column 41 can be automatically controlled. To operate an ammonia oxidation process in accordance with our invention we employ oxygen recorder controller 55 in line 54. This controller produces a continuous record of the oxygen content of the effluent gas from column 38, and it is connected to either controller 12 or valve 56 in line 10, either of which is activated by controller 55, whenever the oxygen content of the effluent gas is outside the desired limits. The activation of controller 12 or valve 56 is by either electrical, mechanical or pneumatic means.

In one embodiment of our invention the amount of air entering column 41 via line 10 and valve 56 is automatically controlled in accordance with the oxygen content of the gas in line 54. Controller 12 is set to obtain the desired air-ammonia mixture, and reactor 26 is operated at the reaction conditions set forth above. Accordingly, whenever the oxygen content of the effluent gas in line 54 exceeds or falls below the desired limits, this oxygen content is an indication that either too much or too little oxygen is entering column 41 for oxidation of nitric oxide in columns 38 and 41. Therefore, controller 55 automatically adjusts valve 56 to increase or decrease, as the case may be, the rate of flow of air to column 41 until the oxygen content of the effluent gas returns to the desired concentration. The setting of valve 56 remains as so adjusted until a further adjustment is necessitated by a variation in the oxygen content recorded by controller 55.

In another aspect of our invention, oxygen recorder controller 55 is employed to adjust the setting of controller 12. In this aspect the flow of air to column 41 via line 10 is manually adjusted to permit the entry of sufficient oxygen to oxidize nitric oxide in column 41 and to obtain a substantially water-white or straw-color product therefrom. Then, when the oxygen content of the effluent gas in line 54 exceeds the desired upper limit, controller 55 adjusts the setting of controller 12 to increase the ammonia concentration of the air-ammonia mixture for the oxidation reaction, and consequently the concentration of excess oxygen in line 54 is decreased. On the other hand, when the oxygen content of the effluent decreases to less than the desired minimum limit, controller 55 adjusts the setting of controller 12 to decrease the ammonia concentration in the feed to reactor 26, and consequently the concentration of excess of oxygen in line 54 is increased. Since the ammonia oxidation reaction is exothermic, any increase or decrease of the ammonia concentration in the feed to the reaction will have an effect upon the reaction temperature in reactor 26. In our process, any such temperature effect is compensated for automatically by controller 27 adjusting the preheat temperature of the inlet air for the reaction.

A portion or all of the effluent gas passing via line 54 is passed via line 57 to heat exchanger 30, and it is then returned to line 54 via line 58. Thus, the effluent gas serves to cool the reaction gases from the oxidation reaction prior to passage of the former via line 54 to power recovery unit 5, where it serves to compress the inlet air to the system. In actual operation the use of power recovery unit 5 on the exhaust gas from the system decreases the overall power consumption for the process by as much as 50 per cent. Exhaust gases from the system are vented via line 59.

Since the gaseous effluent from column 38 contains some nitric acid, line 54 is provided with separator or mist collector 64 for separation of nitric acid via line 65 in order to prevent corrosion of equipment, particularly power recovery unit 5, by this nitric acid.

In the operation of the disclosed process it is important that variations in pressure be kept at a minimum, primarily to reduce variations in the operating conditions of reactor 26 and also to assure a constant pressure to the power recovery unit for its operation. It is essential that the pressures of the air and ammonia entering the oxidation reactor be maintained at a constant value, since variations in one or the other of these feed pressures affect the respective volumes entering the reactor and seriously affect the proper operation of controller 12. In order to insure a minimum pressure variation in the system, line 54 is provided with recording pressure controller 60 which automatically controls the setting of valve 61 and thus maintains a constant back pressure on the system within the range of 75 to 120 pounds per square inch. After passage through valve 61, effluent gases are vented from the system via line 63. In actual operation, there is a pressure drop through the system, and this pressure drop acts as a reducing valve to smooth out any variations in pressure. The minimum pressure drop that should be maintained is 15 pounds per square inch in order to minimize effects upon the temperature in reactor 26 caused by variations in pressure.

Numerous variations and modifications of our invention will be readily apparent to those skilled in the art from our disclosure hereinabove.

We claim:

1. In a plant for producing nitric acid including a catalytic converter, a line supplying ammonia to said converter, a cool air supply line, a heated air supply line joining said cool air line, an air line leading from the juncture of said two air lines to said converter, an air heater in said heated air supply line, a condenser, an absorption column, an effluent line extending from said converter to said condenser to supply an effluent comprising nitrogen oxides, water, and unreacted oxygen to said condenser, means for transferring condensate and uncondensed vapors from said condenser to said absorption column wherein nitrogen oxides are converted to nitric acid, a gaseous effluent conduit extending from the top of said column, and means for withdrawing nitric acid from the bottom of said column, a control system which comprises, in combination, a damper at the junction of said cool air line and said heated air line movable to regulate the proportion of heated air to cool air fed to said converter, a temperature controller having a sensing element in said converter and operatively connected to said damper so as to maintain a constant predetermined converter temperature by regulation of said damper, an oxygen recorder controller having a sensing element in said gaseous effluent conduit, a ratio controller having sensing elements in said ammonia line and said cool air line, and operatively connected to a control valve in one of said lines so as to control the ammonia-air ratio in said converter, said ratio controller being operatively connected to said oxygen recorder controller so as to maintain a predetermined effluent oxygen content through control of said ammonia-air ratio.

2. In a plant for producing nitric acid including a catalytic converter, a line supplying ammonia to said converter, a line supplying air to said converter, a condenser, an absorption column, an effluent line extending from said converter to said condenser to supply an effluent comprising nitric acid, water and unreacted oxygen to said condenser, means for transferring condensate and uncondensed vapors from said condenser to said absorption column wherein nitrogen oxides are converted to nitric acid, a gaseous effluent conduit extending from the top of said column, a bleaching column, means for withdrawing nitric acid from the bottom of said absorption column and passing it to said bleaching column, and a line supplying air to said bleaching column, a control system which comprises, in combination, a ratio controller having sensing elements in said ammonia line and said converter air line, and operatively connected to a control valve in one of said lines so as to control the ammonia-air ratio in said converter, said ratio controller having a settable element capable of a variation to change said ammonia-air ratio, a valve in said air supply line to the bleaching column having an element settable to vary the proportion of air fed to the bleaching column, an oxygen recorder controller having a sensing element in said gaseous effluent conduit, said oxygen recorder controller being operatively connected to one of said settable elements so as to maintain a predetermined effluent oxygen content through control of the oxygen fed to the system.

3. In a plant for producing nitric acid including a catalytic converter, a line supplying ammonia to said converter, a line supplying air to said converter, a condenser, an absorption column, an effluent line extending from said converter to said condenser to supply an effluent comprising nitrogen oxides, water and unreacted oxygen to said condenser, means for transferring condensate and uncondensed vapors from said condenser to said absorption column wherein nitrogen oxides are converted to nitric acid, a gaseous effluent conduit extending from the top of said column, and means for withdrawing nitric acid from the bottom of said column, a control system which comprises, in combination, a ratio controller having sensing elements in said ammonia line and said air line, and operatively connected to a control valve in one of said lines so as to control the ammonia-air ratio in said converter, an oxygen recorder controller having a sensing element in said gaseous effluent conduit, said ratio controller being operatively connected to said oxygen recorder controller so as to maintain a predetermined effluent oxygen content through control of said ammonia-air ratio.

4. In a plant for producing nitric acid including a catalytic converter, means for supplying a mixture of air and ammonia to said converter, a condenser, an absorption column, a bleaching column, an effluent line extending from said converter to said condenser to supply an effluent comprising nitrogen oxides, water, and unreacted oxygen to said condenser, means for transferring cooled effluent from said condenser to said absorption column wherein nirtogen oxides are converted to nitric acid, a gaseous effluent conduit extending from the top of said absorption column, means for withdrawing nitric acid from the bottom of said absorption column and passing it to said bleaching column, means for withdrawing bleached nitric acid from said bleaching column, and a line for supplying air to said bleaching column, a control system which comprises, in combination, a valve in said air line to regulate the amount of air passing to said bleaching column, and an oxygen recorder controller having a sensing element in said gaseous effluent conduit, said recorder controller being operatively connected to said valve so as to maintain a predetermined effluent oxygen content through control of the oxygen fed to said bleaching column.

5. In a plant for producing nitric acid including a catalytic converter, a line supplying ammonia to said converter, a line supplying air to said converter, a condenser, an absorption column, a bleaching column, an effluent line extending from said converter to said condenser to supply an effluent comprising nitrogen oxides, water, and unreacted oxygen to said condenser, means for transferring cooled effluent from said condenser to said absorption column wherein nitrogen oxides are converted to nitric acid, a gaseous effluent conduit extending from the top of said absorption column, means for withdrawing nitric acid from the bottom of said absorption column and transferring it to said bleaching column, means for withdrawing bleached nitric acid from said bleaching column, and a line for supplying air to said bleaching column, a control system which comprises, in combination, a valve in one of said air lines, and an oxygen recorder controller having a sensing element in said gaseous effluent conduit, said recorder controller being operatively connected to said valve so as to maintain a predetermined effluent oxygen content through control of the oxygen introduced into the system through said valve.

6. In an absorption system for producing nitric acid, in combination, an absorption column, a bleaching column, means for introducing nitrogen oxides, oxygen and water to said absorption column to produce nitric acid therein, a heater, a line for circulating a heating medium through said heater, a valve in said line, a line connecting the bottom of said absorption column to said heater to remove nitric acid therefrom, a line extending from said heater to said bleaching column to transfer heated nitric acid to the bleaching column, a temperature controller having a sensing element in said last-mentioned line and operatively connected to said valve to maintain a constant predetermined temperature in said last-mentioned line through regulation of the amount of heating medium circulated through said heater, means for admitting air to said bleaching column, and means for withdrawing bleached nitric acid therefrom.

7. In an absorption system for producing nitric acid, in combination, an absorption column, a bleaching column, means for introducing nitrogen oxides and water to said absorption column to produce nitric acid therein, a heater, a line for circulating a heating medium through said heater, a valve in said line, a line connecting the bottom of said absorption column to said heater to remove nitric acid therefrom, a line extending from said heater to said bleaching column to transfer heated nitric acid to the bleaching column, a tempertaure controller having a sensing element in said last-mentioned line and operatively connected to said valve to maintain a constant predetermined temperature in said last-mentioned line through regulation of the amount of heating medium circulated through said heater, means for admitting air to said bleaching column, means for withdrawing bleached nitric acid therefrom, a line supplying water in a fluid state to the top of said absorption column, a second control valve in said last-mentioned line, a density controller having a sensing element in the line connecting said heater with said bleaching column, said density controller being operatively connected to said second control valve to maintain a constant density of the heated nitric acid in the line connecting said heater with said bleaching column by regulation of the water fed to said absorption column.

References Cited in the file of this patent

UNITED STATES PATENTS

| Number | Name | Date |
|---|---|---|
| 1,594,264 | Howard | July 27, 1926 |
| 1,644,123 | Griswold | Oct. 4, 1927 |
| 1,709,042 | Siebert | Apr. 16, 1929 |
| 1,770,059 | Barber | July 9, 1930 |
| 1,923,865 | Handforth | Aug. 22, 1933 |

(Other references on following page)

UNITED STATES PATENTS

| Number | Name | Date |
|---|---|---|
| 2,046,162 | Handforth et al. | June 30, 1936 |
| 2,088,057 | Handforth | July 27, 1937 |
| 2,090,921 | Titlestad | Aug. 24, 1937 |
| 2,135,733 | Richardson | Nov. 8, 1938 |
| 2,185,579 | Beekhuis | Jan. 2, 1940 |
| 2,226,113 | Chastain | Dec. 24, 1940 |
| 2,393,362 | Gerhold | Jan. 22, 1946 |
| 2,417,877 | Lewis | Mar. 25, 1947 |
| 2,462,995 | Ritzmann | Mar. 1, 1949 |

OTHER REFERENCES

Taylor et al.: "Manufacture of Nitric Acid by the Oxidation of Ammonia," Ind. and Eng. Chem., vol. 23, No. 8, pages 860–865, August 1931.

Chem. and Met. Reports, Chem. and Met. Engineering, May 1943, pages 97–114.

"Chemical Engineering," vol. 55, No. 11, pages 106, 107, November 1948.

Webb: "Absorption of Nitrous Gases," pages 330–336. Longmans, Green and Co., N. Y. C., 1923.